United States Patent Office 3,378,496
Patented Apr. 16, 1968

3,378,496
DETERGENT COMPOSITIONS USEFUL FOR
DRY CLEANING
Gerard Leon Alphonse Mangeney, Deuil-la-Barre, and
Jacques Pierre Edmond Pechmeze, Paris, France, assignors to Etablissements Kuhlmann, Paris, France
No Drawing. Filed May 8, 1964, Ser. No. 366,147
Claims priority, application France, May 10, 1963,
934,385
1 Claim. (Cl. 252—161)

The present invention concernes new compositions useful for dry cleaning and process for their manufacture.

The new compositions of the present invention enable the efficiency of the cleaning technique known as "dry cleaning" to be increased.

In general, the water-soluble dirty marks, called "thin stains," are not removed, and this makes it necessary for a large percentage of the dry-cleaned clothing to be taken back and subjected to treatment by a wet process, indicated in practice by the name "wet rinsing." This subsequent treatment obviously constitutes a waste of time, but above all, it may cause the clothing to lose its pristine appearance, which may sometimes be forever.

Dry cleaning also sets another problem. If the insoluble dirt, detached from the clothes, is not kept completely in suspension, it may be redeposited on the clothes and give them a dull appearance, not pleasing to the eye, known in practice as "greying."

To find a solution to the two problems, namely elimination of the wet rinsing and of greying, has been the aim of numerous investigations of late. These studies have resulted in the appearance on the market of a large number of auxiliary products, referred to by the general term "dry cleaning detergents," the principal function of which is to permit the incorporation in the dry cleaning solvent of a quantity of water sufficient to remove the thin spots and to maintain the insoluble dirt in suspension in order to avoid greying.

The detergents proposed up to the present belong generally either to the anionic surface-active class of products of the alkylsulphonate, alkylarylsulphonate or alkyl sulphate type, or to the non-ionic surface-active class of products such as the derivatives obtained by condensing an alkylene oxide (e.g. ethylene oxide or propylene oxide) with a substance having a mobile hydrogen in its molecule, such as an aliphatic alcohol, aliphatic amine or alkylphenol.

Mixtures of various proportions of the two preceding classes of surface-active compounds have also been suggested as dry-cleaning detergents.

It has now been found according to the present invention, that combinations of surface-active agents defined below lead to dry-cleaning detergents possessing to an exceptionally high degree the power of removing the thin spots and of eliminating greying.

According to the present invention a composition useful for dry-cleaning is provided consisting essentially of a surface active agent mixture for each 100 parts of which there are (a) From 50 to 80 parts of non-ionic agent resulting from the condensation of alkylene oxide with a member selected from the group consisting of aliphatic alcohols, aliphatic alkylolamides and alkylphenols.

(b) From 7 to 35 parts of anionic agent selected from the group consisting of alkylsulphonates and alkylarylsulphonates.

(c) From 7 to 20 parts of anionic agent having one of the formulae:

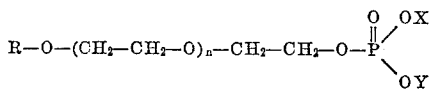

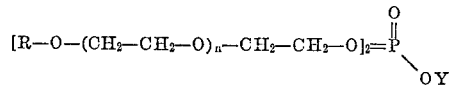

wherein R represents an organic residue containing from 7 to 22 carbon atoms, $n$ is a whole number from 0 to 29, X and Y each represents a member selected from the group consisting of hydrogen, sodium, potassium and ammonium.

Thanks to the use of the combinations according to the invention the power of retention of the water in the solvent is very high, hence there is very good elimination of the thin spots; the proportion that need to be subjected to the wet rinsing is particularly small, generally less than 5% of the number of pieces cleaned. The detergents according to the invention, on the other hand, possess a very great dispersing power with regard to insoluble dirt with consequent substantially total suppression of the greying phenomenon. After cleaning, the colours of the clothes are of exceptional brightness. To combinations according to the invention in addition have no corrosive action with regard to metals occurring in the dry cleaning material apparatus, thanks to the presence of a surface-active agent of the phosphoric ester type.

In French Patent No. 1,258,976 of Mar. 10, 1960, the phosphates of polyethoxylated alkylphenols have been recommended as auxiliary products for dry cleaning and it is mentioned that they are capable of being mixed with non-ionic surface-active compounds or with anionic surface-active compounds, but the ternary mixtures of the present invention are new and have proved to be particularly advantageous for dry cleaning.

The following examples, in which the parts indicated are parts by weight unless the contrary is indicated, illustrate the invention without restricting it.

Example 1

200 parts of dry dodecylbenzene-sodium sulphonate, 320 parts of the product resulting from the condensation of 8 molecules of ethylene oxide with one molecule of nonylphenol, 200 parts of perchlorethylene and 80 parts of the sodium salt corresponding to the formula:

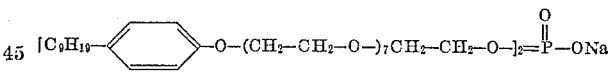

the production of which is described in Example 6 of French Patent No. 1,258,976, are introduced into an apparatus provided with a stirring device, a reflux condenser and a thermometer. The whole is heated at a temperature between 80° C. and 90° C. until the dodecylbenzene sodium sulphonate has completely dissolved. 800 parts of an oily, clear yellow, fairly viscous liquid are obtained which can be used as a dry cleaning detergent.

Example 2

Into an apparatus similar to that of Example 1 are introduced 200 parts of dodecylbenzene-sodium sulphonate, 320 parts of the product resulting from the condensation of one molecule of nonylphenol with 4 molecules of ethylene oxide, 200 parts of perchlorethylene and 80 parts of a phosphoric ester corresponding to the formula:

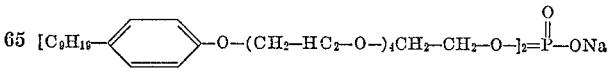

obtained by the process described in Example 6 of French Patent No. 1,258,976. After heating the mixture at a temperature between 80° C. and 90° C. until the dodecylbenzene-sodium sulphonate has completely dissolved, 800 parts of a clear yellow fairly dense oil are obtained which is an excellent dry cleaning detergent.

Example 3

80 parts of dodecylbenzene-sodium sulphonate, 440 parts of the product resulting from the condensation of one molecule of nonylphenol with 4 molecules of ethylene oxide, 200 parts of perchlorethylene and 80 parts of the sodium salt of the phosphoric ester of Example 2 are heated at a temperature between 80° C. and 90° C. until the dodecylbenzene-sodium sulphonate has completely dissolved. 800 parts of an oily, pale yellow, viscous product are obtained which is perfectly soluble in chlorinated solvents (e.g. perchlorethylene and trichlorethylene) and in heavy hydrocarbons (e.g. white spirit and dry cleaning solvent F) and is an excellent dry cleaning detergent.

Example 4

200 parts of the sodium salt of an alkylsulphonic acid the alkyl radical of which contains an average of 16 carbon atoms, 320 parts of the product resulting from the condensation of 4 molecules of ethylene oxide with one molecule of octylphenol, 200 parts of perchlorethylene and 80 parts of the sodium salt of the phosphoric ester of Example 1, are introduced into an apparatus similar to that of Example 1. The mixture is heated at a temperature between 80° C. and 90° C. until it is perfectly homogeneous. 800 parts of an oily, pale yellow product are obtained which can be used as a dry cleaning detergent.

Example 5

80 parts of dodecylbenzene-sodium sulphonate, 400 parts of the product resulting from the condensation of 6 molecules of ethylene oxide with one molecule of lauryl alcohol, 200 parts of perchlorethylene and 120 parts of the sodium salt of the phosphoric ester of Example 2, are introduced into an apparatus similar to that of Example 1. After heating at a temperature between 80° C. and 90° C. until the dodecylbenzene-sodium sulphonate has completely dissolved, 800 parts of an oily, clear yellow, fairly viscous liquid are obtained which is soluble in all proportions in the solvents used for dry cleaning and is an excellent detergent for the latter process.

Example 6

Into an apparatus similar to that of Example 1 are introduced 160 parts of dodecylbenzene-sodium sulphonate, 320 parts of the product resulting from the condensation of 3 molecules of ethylene oxide with one molecule of the monoethanolamide of lauric acid, 200 parts of perchlorethylene and 120 parts of the potassium salt of the phosphoric ester corresponding to the formula:

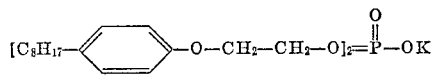

the preparation of which is the subject of Example 2 of French Patent No. 1,258,976. After heating at a temperature between 80° C. and 90° C. until the dodecylbenzene-sodium sulphonate has completely dissolved, 800 parts of an oily, clear yellow, viscous product are obtained which can be used as a dry cleaning detergent.

Example 7

The two tanks A and B of a dry cleaning apparatus are each filled with 100 litres of perchlorethylene. 0.5 kg. of the product described in Example 1 and 0.1 litre of water are placed in the container B. In the drum of the machine are placed 30 pieces of clothing (coats and trousers). A preliminary washing is carried out with the perchlorethylene in the container A, the filter of the machine being connected, then a washing with the bath in the container B, the filter being disconnected, and finally a rinsing with the solvent in the container A, the filter being connected. After draining and drying, the 30 pieces have a very good brightness of colour, a soft, very pleasant handle, and can be directly subjected to finishing operations, e.g. steaming or ironing, without it being necessary to subject any of them to a wet treatment.

Example 8

A dry cleaning operation is carried out in a machine capable of treating 40 kgs. of clothing and equipped with a filter, a tank A containing 700 litres of perchlorethylene and a tank B with a capacity of 180 litres, filled with perchlorethylene. 17.5 kgs. of the product described in Example 2 are introduced into the tank A. 37 pieces of light woolen goods are placed in the drum, and are washed with the bath in the tank A, the solvent being continuously filtered. The goods are then drained, rinsed with the perchlorethylene in the tank B and dried. Of the 37 pieces thus treated only one needs to be further wet-treated, which represents 2.6% of the good treated.

Example 9

The tank of a machine capable of treating 40 kgs. of clothing is filled with 600 litres of dry cleaning solvent F, and then 3 kgs. of the product described in Example 3 and 1.5 litres of water are added. 28 waterproof garments are placed in the drum and are first cleaned with the filter connected, then with the filter disconnected and finally with the filter connected. The clothes are drained, then dried. Of the 28 garments subjected to cleaning, one only has to be further wet-treated, which represents 3.6% of the pieces treated. In addition, all the clothes are very bright in colour, owing to a complete absence of greying, and have a soft and pleasant handle.

We claim:
1. A composition useful for dry-cleaning consisting essentially of a surface active agent mixture for each 100 parts of which there are (a) from 50 to 80 parts of nonionic agent resulting from the condensation of an ethylene oxide with an alkylphenol selected from the group consisting of nonyl phenol and octyl phenol, (b) from 7 to 35 parts of anionic agent selected from the group consisting of dedecylbenzene-sodium sulfonate and the sodium salt of an alkylsulphonic acid wherein the alkyl group contains an average of 16 carbon atoms, (c) from 7 to 20 parts of anionic agent having the formula selected from the group consisting of:

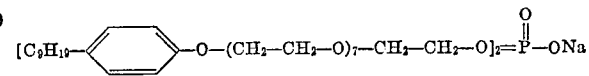

and

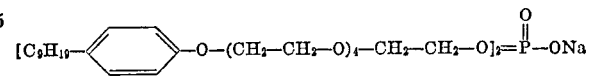

References Cited

UNITED STATES PATENTS

| | | | |
|---|---|---|---|
| 2,941,952 | 6/1960 | Lewis et al. | 252—161 |
| 3,018,251 | 1/1962 | Mayhew et al. | 252—152 |

FOREIGN PATENTS

| | | |
|---|---|---|
| 1,258,976 | 3/1960 | France. |

LEON D. ROSDOL, *Primary Examiner.*

S. D. SCHNEIDER, *Assistant Examiner.*